(12) United States Patent
Wu

(10) Patent No.: US 7,437,919 B1
(45) Date of Patent: Oct. 21, 2008

(54) MULTIPLE-FUNCTION TIRE VALVE CAP WITH LOW PRESSURE SAFETY INDICATOR

(76) Inventor: Min Wu, 1219 Brandybuck Way, San Jose, CA (US) 92121

( * ) Notice: Subject to any disclaimer, the term of this patent is extended or adjusted under 35 U.S.C. 154(b) by 0 days.

(21) Appl. No.: 11/787,924

(22) Filed: Apr. 18, 2007

(51) Int. Cl.
G01M 17/02 (2006.01)
(52) U.S. Cl. .......................................... 73/146; 340/442
(58) Field of Classification Search ................... 73/146; 340/442; 116/34 R
See application file for complete search history.

(56) References Cited

U.S. PATENT DOCUMENTS

| | | | |
|---|---|---|---|
| 1,427,389 A | | 8/1922 | Horne |
| 1,429,313 A | | 9/1922 | Badowski |
| 1,494,001 A | | 5/1924 | McPherson |
| 2,056,754 A | | 10/1936 | Wahl |
| 2,096,328 A | | 10/1937 | Iskyan |
| 3,068,703 A | | 12/1962 | Morton |
| 3,677,218 A | * | 7/1972 | Dixon et al .................. 116/272 |
| 3,789,669 A | | 2/1974 | Passman |
| 3,906,988 A | | 9/1975 | Mottram |
| 3,975,959 A | | 8/1976 | Larkin |
| 3,999,431 A | | 12/1976 | Makarainen |
| 4,155,261 A | | 5/1979 | Hesse et al. |
| 4,250,759 A | | 2/1981 | Vago et al. |
| 4,476,803 A | | 10/1984 | Malec |
| 4,480,580 A | * | 11/1984 | Nalence ..................... 116/34 R |
| 4,517,848 A | | 5/1985 | Faure |
| 4,520,664 A | * | 6/1985 | Kramer ...................... 73/146.8 |
| 4,586,382 A | | 5/1986 | Sinha |
| 4,686,855 A | | 8/1987 | Smith |
| 4,704,901 A | | 11/1987 | Rocco et al. |
| 4,748,845 A | | 6/1988 | Rocco et al. |
| 4,755,638 A | | 7/1988 | Geberth, Jr. |
| 4,768,460 A | | 9/1988 | Soon-Fu |
| 4,885,940 A | | 12/1989 | Huang |
| 4,945,337 A | * | 7/1990 | Huang ........................ 340/442 |
| 4,966,035 A | | 10/1990 | Huang |
| 4,970,899 A | | 11/1990 | Huang |
| 4,998,438 A | | 3/1991 | Martin |
| 5,025,244 A | * | 6/1991 | Huang ........................ 340/442 |
| 5,027,740 A | * | 7/1991 | Kramer et al. ............ 116/34 R |

(Continued)

OTHER PUBLICATIONS

Kester, Walt, "Practical Design Technologies for Sensor Signal Conditioning", 1999, Analog Devices, Inc., pp. 1.1-2.19.

Primary Examiner—Andre J Allen
(74) Attorney, Agent, or Firm—Patent Law Office of Larry Guernsey; Larry B. Guernsey

(57) ABSTRACT

A multiple-function valve cap is disclosed for mounting on a valve stem of a tire for indicating a safe pressure condition or a low pressure warning. The multiple-function valve cap includes a pressure indicator assembly having a piston including a safe pressure indicator, and an internal bore. A warning indicator is seated within the internal bore of the piston. A biasing spring is fitted between the low pressure warning indicator and the safe pressure indicator, and acts to urge them apart, such that the warning indicator is displayed when low pressure is applied to the piston. When a safe level of air pressure is applied to the piston, the piston is moved against the force of the biasing spring to surround the warning indicator, and the safe pressure indicator is displayed.

13 Claims, 5 Drawing Sheets

U.S. PATENT DOCUMENTS

| | | |
|---|---|---|
| 5,083,457 A | 1/1992 | Schultz |
| 5,113,695 A | 5/1992 | Huang |
| 5,168,751 A | 12/1992 | Hwang |
| 5,394,343 A | 2/1995 | Tsao |
| 5,576,484 A | 11/1996 | Hwang |
| 5,625,144 A | 4/1997 | Chang |
| 5,710,370 A | 1/1998 | Gokhfeld |
| 5,965,822 A | 10/1999 | Wu |
| 5,983,728 A | 11/1999 | Weng |
| 6,011,462 A | 1/2000 | Cooper |
| 6,525,655 B2 | 2/2003 | Huang |
| D496,602 S | 9/2004 | Shipman |
| 7,013,833 B2 * | 3/2006 | Lemberger et al. ........ 116/34 R |
| 7,086,272 B2 | 8/2006 | Wu et al. |
| 2002/0073911 A1 | 6/2002 | Lapohn |
| 2004/0020420 A1 | 2/2004 | Evans et al. |
| 2005/0088321 A1 | 4/2005 | Weber |
| 2005/0223966 A1 * | 10/2005 | Lemberger et al. ........ 116/34 R |

\* cited by examiner

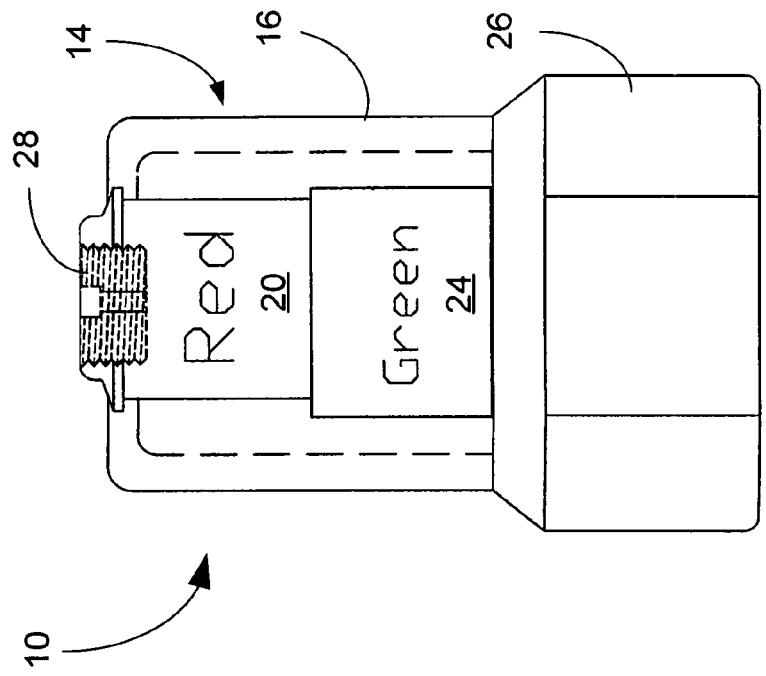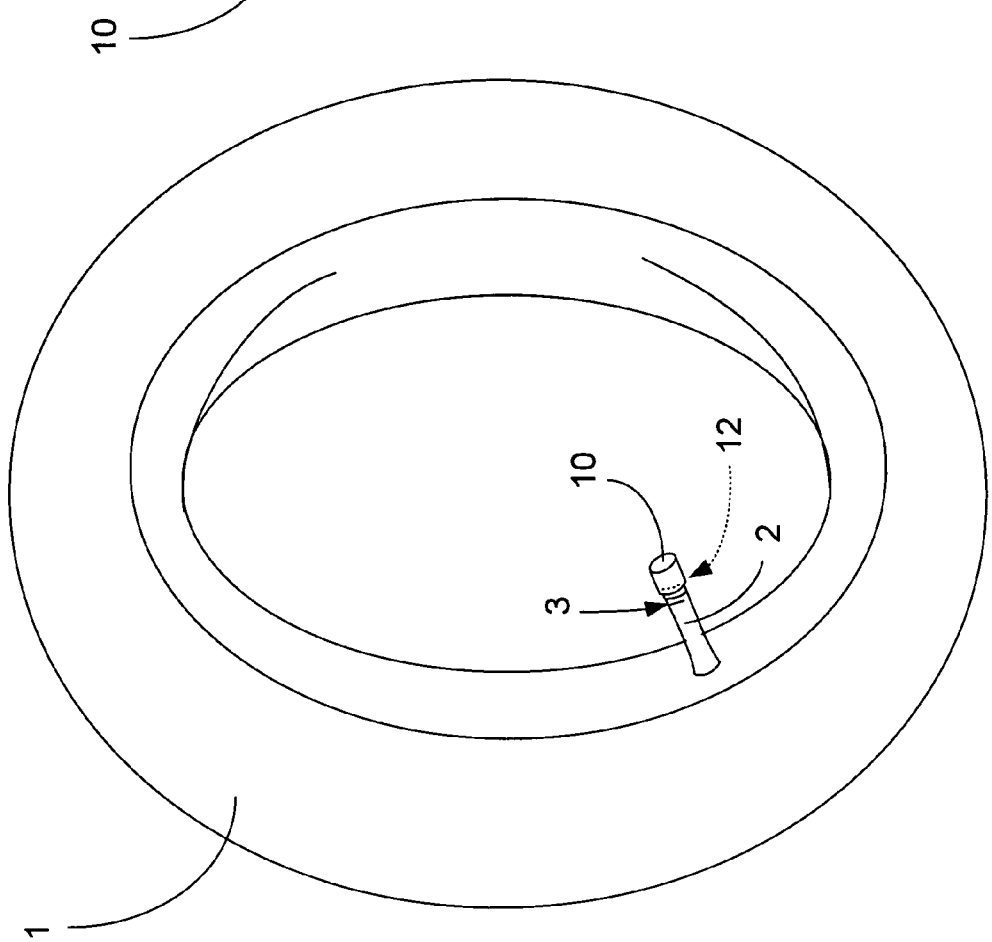

MULTIPLE-FUNCTION TIRE VALVE CAP WITH LOW PRESSURE SAFETY INDICATOR

This application makes reference to the Disclosure Document filed Jan. 9, 2007 by the present inventor.

BACKGROUND OF THE INVENTION

1. Field of the Invention

The present invention relates generally to pressure gauges and more particularly to a low pressure safety indicator, which is incorporated into a tire valve cap for a tire valve stem.

2. Description of the Prior Art

As highways become ever more crowded, safety becomes ever more important for the millions of people who use automobiles for transportation. Improper tire pressure is a major cause of tire malfunction and can also have a significant effect on gas mileage achieved by the vehicle. A tire that is under-inflated causes more drag, more friction and more heat, thus rolls less efficiently than a tire with proper inflation. In extreme cases, under-inflation can result in wear and over heat on improper portions of the tire and can even contribute to blow-outs. Thus, it is very important that drivers have an easy and convenient way to monitor the low pressure in their vehicle's tires.

The conventional device for checking tire pressure is the well-known "tire pressure gauge", which is applied to the valve stem of each tire in turn. Internal pressure forces a tire pressure gauge indicator to emerge from the gauge's casing, and the tire pressure gauge indicator includes markings or digital numbers which indicate the level of pressure in the tire. However, each valve stem generally includes a valve cap, which keeps grit and road grime from getting into the tire valve. In order to measure the tire pressure, this valve cap must be removed, and placed in a safe place, while the tire pressure gauge is pressed onto the valve stem. There is usually some loss of pressure during this operation, which can be unfortunate for some tires which have borderline low pressure to begin with. Additionally, the application of the gauge generally requires the user to kneel or stoop on the roadway near the tire, which can be awkward and messy, and damaging to clothing. At a minimum, the user's hands generally become soiled to some degree, and the markings on the stick tire gauge can be difficult to make out, especially in dim light. Consequently, many users find it inconvenient to make proper pressure checks and the tire pressure of many vehicles are under-inflated. Recent legislation in the U.S. (namely the Transportation Recall Enhancement, Accountability, and Documentation, or "TREAD" act), has mandated the use of tire valve caps with low pressure warning indicators to correct this problem.

Thus, there is a need for a tire valve cap which does not require removal from a valve stem, is easy to use to check tire pressure and does not require the user to get messy in order to properly inflate a tire. The user is thus encouraged to monitor pressure more closely and may travel more safely.

There have previous attempts to develop more convenient tire pressure indicators which address some of these concerns. In particular, U.S. Pat. No. 1,494,001 to McPherson discloses a combined dust cap and tire gauge having numerical values which are displayed by markings on the exterior of the cap in response to internal tire pressure. This has the disadvantage of being difficult to read from a distance or in dim light. U.S. Pat. No. 5,083,457 to Schultz discloses a remotely actuated tire pressure sensor having a transducer mounted on a tire stem which sends information to a hand-held remote display unit. This includes electronics which may be fragile and costly to manufacture, and requires the use of a remote display unit, which may become lost or damaged. U.S. Pat. No. 6,525,655 to Huang discloses a diaphragm-type tire pressure gauge which can include an internal rod which is advanced by air pressure from a tire to display various colors or marked with data units. An alternate of Huang includes an LED which is activated by tire pressure. This however, requires electronics including a power supply of some sort, and can be expected to be costly and relatively difficult to manufacture.

Thus, there is a need for a tire valve cap which uses a simple mechanical mechanism without external power which is easy and inexpensive to use, allows easy addition of air to the tire, presents an easily readable low pressure safety indication and is less susceptible to become unreadable or discolored than prior devices.

SUMMARY OF THE INVENTION

A multiple-function valve cap is disclosed for mounting on a valve stem of a tire for indicating either a safe pressure condition or a low pressure warning, which allows easy addition of air into tires. For purposes of this application, this tire multiple-function valve cap will be referred to as a tire valve cap. The tire valve cap includes a low pressure indicator assembly having a piston including a safe pressure indicator, an internal bore, and a bottom plate. A low pressure warning indicator is seated within the internal bore of the piston. A biasing spring is fitted between the low pressure warning indicator and the safe pressure indicator, and acts to urge them apart, such that the low pressure warning indicator is displayed when insufficient pressure is applied to the piston. When a safe level of air pressure is applied to the piston, the piston is moved against the force of the biasing spring to surround the low pressure warning indicator, and the safe pressure indicator is displayed.

It is an advantage of the present invention that it provides an easy visual representation of the pressure in each of a user's tires, which can be viewed without close inspection or the reading of numbers on a gauge.

It is another advantage of the present invention that it provides a visual display that can be easily viewed without carrying or attaching additional equipment.

It is a further advantage of the present invention that it provides a tire valve cap that remains in place on a tire even while the tire is in operation.

It is yet another advantage of the present invention that it provides a tire valve cap that is relatively inexpensive and easy to manufacture.

It is an additional advantage of the present it provides a tire valve cap that can be calibrated to adapt to many types and models of tires having different pressure requirements.

It is an additional advantage of the present it provides a tire valve cap that provides a visual display without using external power.

It is a yet further advantage of the present that it allows additional high pressure air to be added to a tire while the tire valve cap is still mounted on the tire's valve stem.

It is another advantage of the present that it provides a tire valve cap that is easy to monitor even in dim light and thus encourages proper monitoring of pressure, and safe operation of the vehicle on which it is used.

The foregoing and other objects, features and advantages of the present invention will be apparent from the following detailed description of the preferred embodiments, which make reference to the several figures of the drawings.

IN THE DRAWINGS

FIG. 1 is an isometric view of a representative tire showing the mounting position of the tire valve cap of the present invention;

FIG. 2 is a side plan view of the tire valve cap of the present invention;

DETAILED DESCRIPTION OF THE PREFERRED EMBODIMENTS

Figure 3:
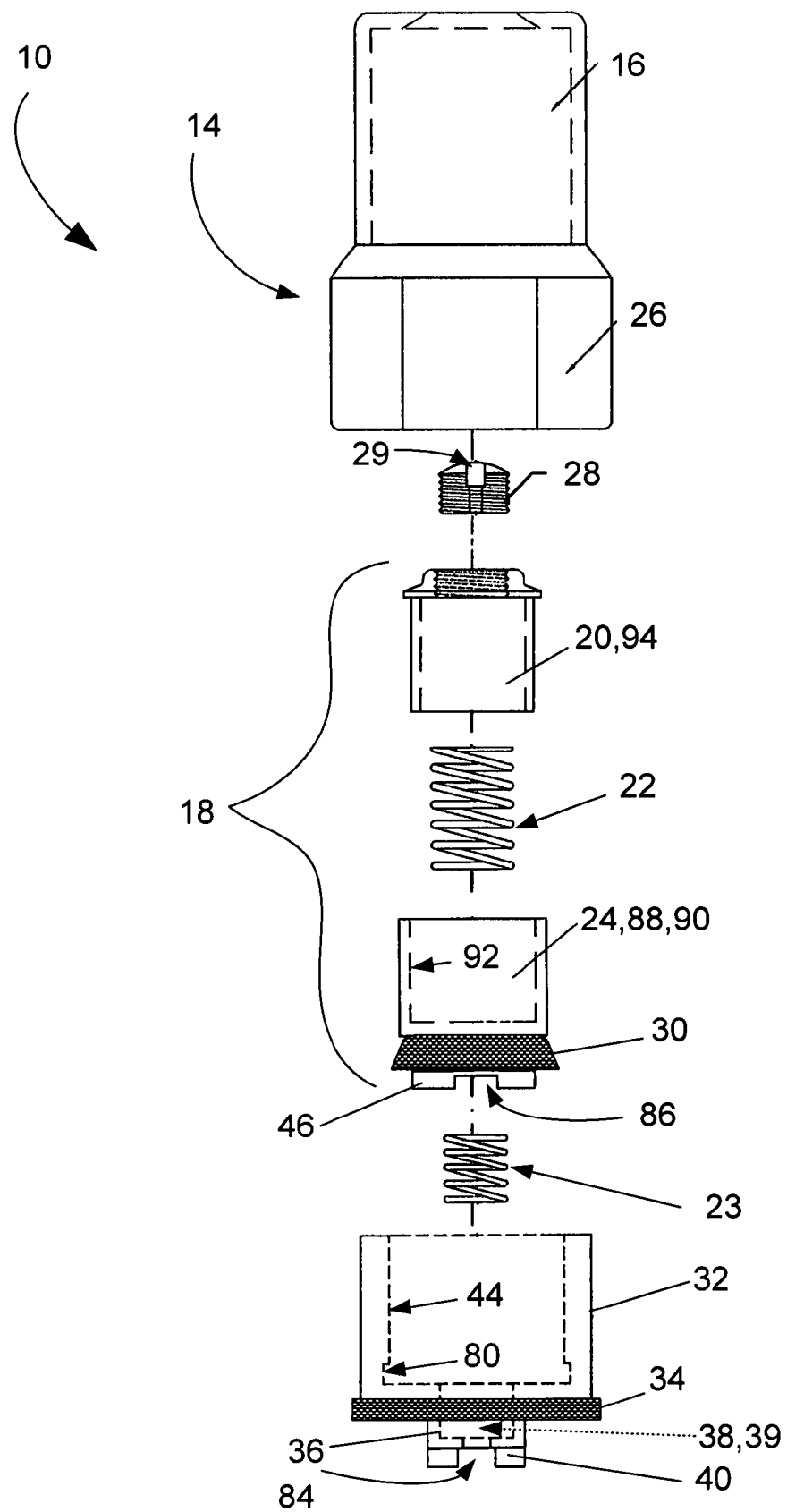
FIG. 3 is an exploded side view of the tire valve cap of the present invention.

The present invention comprises a tire valve cap, which is configured as a tire valve stem cap, as depicted in FIGS. 1-6C, all of which will be referred to generally in the following discussion.

A tire 1 of general type is shown in FIG. 1, having a valve stem 2, having exterior threads 3. The present tire valve cap 10 is shown mounted on the valve stem 2 by means of interior threads 12 (see FIG. 4) in the tire valve cap 10, in the usual manner in which a cap is mounted on a valve stem of a tire.

Figure 4:
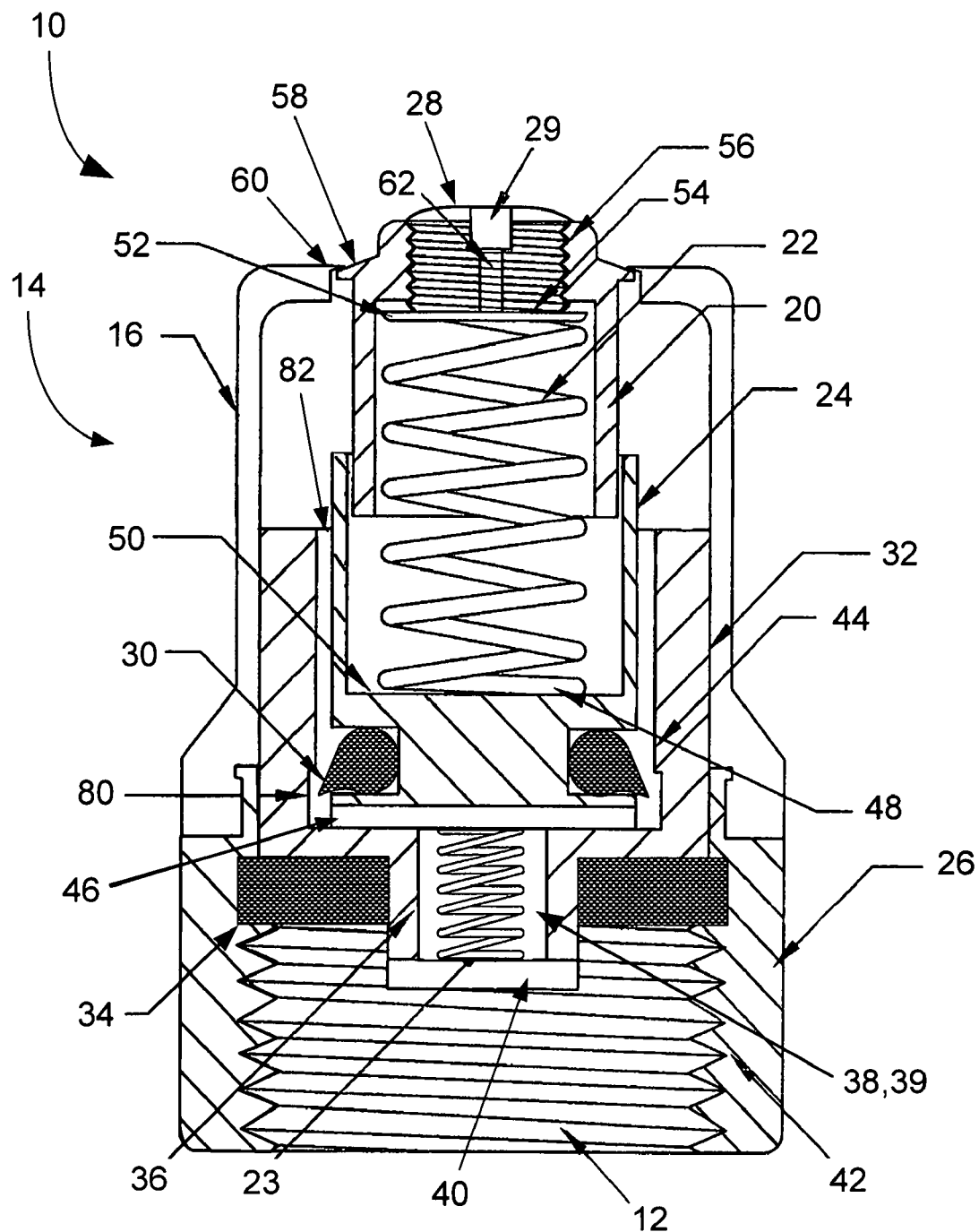
FIG. 4 is a cutaway view of the tire valve cap of the present invention when disengaged from mounting on a tire stem.

As shown particularly in FIGS. 2-4, the tire valve cap 10 includes a housing 14, which has at least one transparent cylindrical portion 16, preferably made of transparent plastic. Within the housing 14, is a pressure indicator assembly 18, which includes an inner colored sleeve 20, which is preferably red in color, a biasing spring 22, and an outer colored sleeve 24, which is preferably green in color. As will be discussed below, the outer sleeve 24 is movable around the inner sleeve 20, and can act to cover the inner sleeve 20 when sufficient air pressure acts to force the outer colored sleeve 24 against the force of the biasing spring 22. The housing 14 also includes a locking nut portion 26, which contains the internal threads 12, and a calibration screw 28 having a screw slot 29, which will be discussed below.

The outer colored sleeve 24 is fitted with a lipped O-ring 30. An internal housing 32 fits within the housing 14, and surrounds the outer colored sleeve 24. The lower portion of the internal housing 32 shall be referred to as the air nozzle 36, which surrounds an air passage 38. The tip of the air nozzle 36 has a contact plate 40. A gasket seal 34 surrounds a portion of the air nozzle 36 and makes an air-tight seal with the inner walls 42 of the locking nut portion 26 (see especially FIG. 4). The inner bore 44 of the internal housing 32 is larger than the diameter of the outer colored sleeve 24, and thus leaves an air passage 82 which is connected to the air passage 38 in the air nozzle 36, as will be discussed below. The outer colored sleeve 24 also includes a bottom plate 46.

A secondary spring 23 is also preferably included which seats in a cavity 39 in the internal housing 32. As will be discussed below, this secondary spring 23 aids air pressure from the tire to urge the outer colored sleeve 24 upwards against the biasing spring 22.

FIG. 4 shows the tire valve cap 10 disengaged from any tire valve stem 2. The biasing spring 22 is captured in the space surrounded by the inner colored sleeve 20 and the outer colored sleeve 24. The lower end 48 of the spring 22 contacts the upper internal surface 50 of the outer colored sleeve 24, and the upper end 52 of the spring 22 contacts the lower face 54 of the calibration screw 28, included in the inner colored sleeve 20. When the tire valve cap 10 is disengaged, the biasing spring 22 forces the outer colored sleeve 24 downward so that the bottom plate 46 contacts the internal housing 32. The calibration screw 28 is fitted in the screw threads 56 in the inner colored sleeve 20, so as the biasing spring 22 forces the calibration screw 28 upward, the inner colored sleeve 20 is urged upwards as well. The upward movement of the inner colored sleeve 20 is stopped by flanges 58 on the inner colored sleeve 20 which contact a lip 60 on the main housing 14. The secondary spring 23 is also shown seated in the cavity 39 in the internal housing 32.

There is an air vent 62 in the calibration screw 28. This air vent 62 allows the air pressure within the inner colored sleeve 20 to remain at atmospheric pressure, and thus does not oppose the upward movement of the outer colored sleeve 24. It will be seen that the compression of the biasing spring 22 is adjustable by advancing the calibration screw 28 in the threads 56 of the inner colored sleeve 20, by use of a tool inserted into the screw slot 29. By this mechanism, the tire valve cap 10 can be calibrated, as will be discussed below.

Figure 5A:
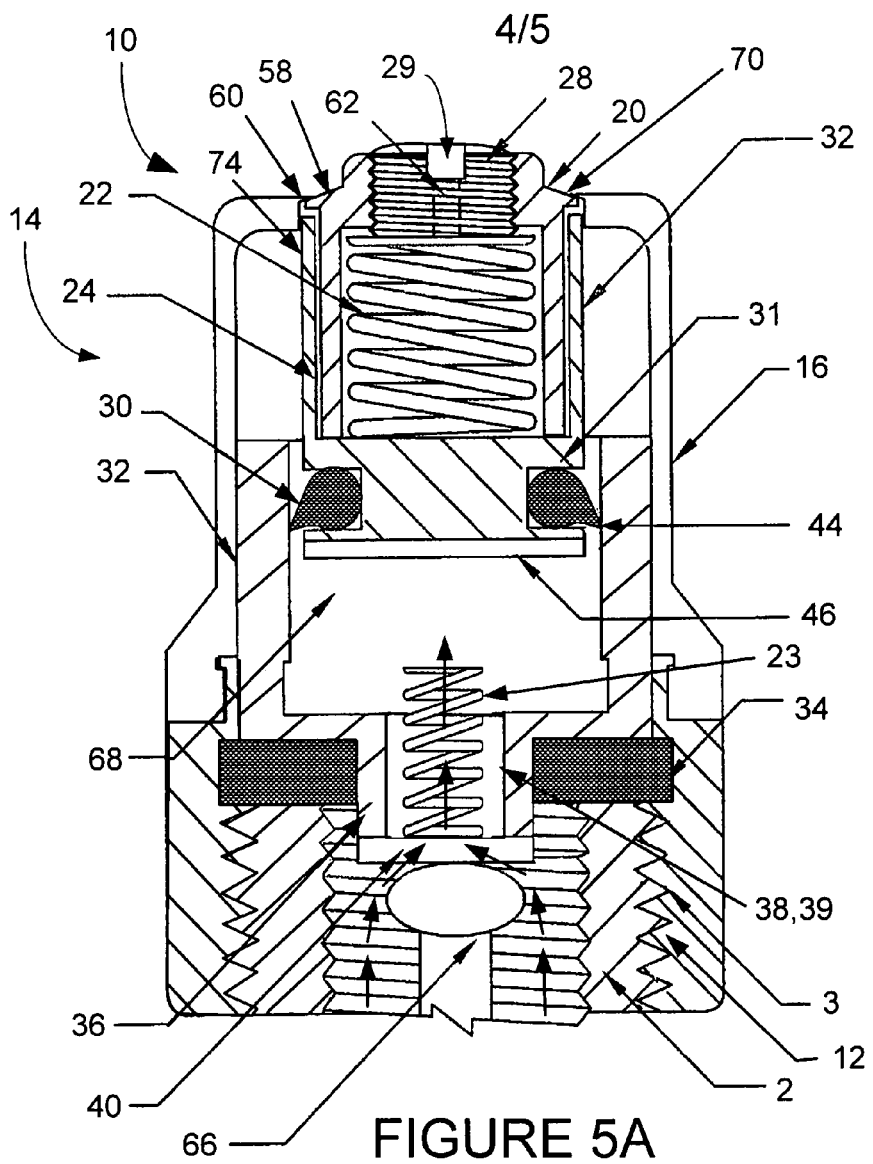
FIG. 5A is a cutaway view of the tire valve cap of the present invention when engaged on a tire stem which contains sufficient pressure.

FIG. 5A shows the tire valve cap 10 mounted in place on a tire valve stem 2 on a tire with a sufficient amount of air pressure. The tire valve cap 10 has been screwed on so that the internal threads 12 of the tire valve cap 10 have engaged the external threads 3 of the valve stem 2. As the tire valve cap 10 is screwed on, the valve core pin 66 of the valve stem 2 meets the contact plate 40 of the air nozzle 36. As the tire valve cap 10 advances further in its threaded engagement with the valve system, the valve core pin 66 is depressed by the contact plate 40, and air is released from the tire 1 (see FIG. 1).

Figure 5B:
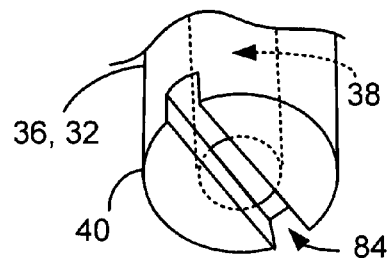
FIG. 5B is an detail isometric view of the contact plate of the internal housing.

Referring now also to FIG. 5B, a perspective view is shown of the contact plate 40 of the air nozzle 36 of the internal housing 32. A slot or horizontal passage 84 is shown formed in the contact plate 40. This allows air flow from the tire 1 to enter the contact plate 40 through the horizontal passage 84 and pass into and through the air passage 38 in the air nozzle 36 into the air chamber 68. As this air is at greater pressure than that of the atmosphere, it pushes against the bottom plate 46 of the outer colored sleeve 24. Aided by the secondary spring 23, this forces the entire outer colored sleeve 24 upwards, compressing the biasing spring 22. The lipped O-ring 30 is seated in an O-ring groove 31 made in the outer colored sleeve 24, and it contacts the smooth surface of the internal housing inner bore 44, creating an air-tight seal. This leaves an air chamber 68, which becomes larger in extent as the air pressure is higher. If the air pressure in this air chamber 68 is sufficient, the green outer colored sleeve 24 is forced upward against the force of the biasing spring 22 until it surrounds the red inner colored sleeve 20. Thus, the user can observe that the color viewed through the transparent portion 16 of the main housing changes from red to green, indicating a sufficient amount of air pressure in the tire for safe operation. As long as the air pressure in the tire remains sufficient, the green inner colored sleeve 24 safety indicator will be visible through the transparent portion 16. However, if the pressure falls too low, then the biasing force of the spring 22 will overcome the force of the air pressure in the air chamber 68, and the green outer colored sleeve 24 safety indicator will be forced down out of the transparent portion 16, and the red colored inner sleeve 20 will be displayed as a low pressure warning indication.

This tire valve cap 10 that provides a mechanism for warning the user of the status of pressure in each of the tires 1 which is convenient, easy to observe, even in dim light, and the colored sleeves 20, 24 are located in close proximity to the transparent housing 16, so they are more easily visible than indicators of the prior art.

Figures 6A, 6B, 6C:
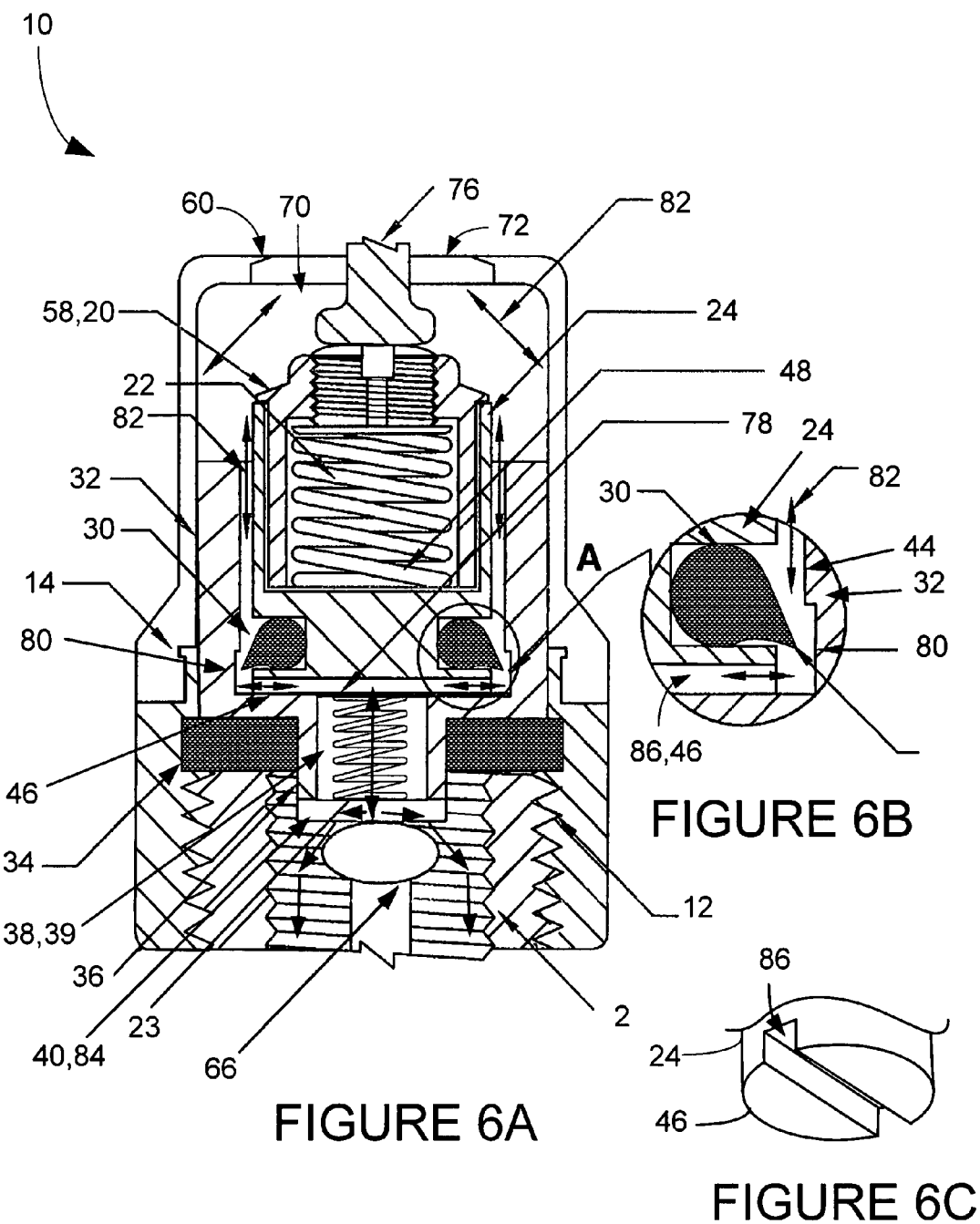
FIG. 6A is a cutaway view of the tire valve cap of the present invention when engaged on a tire stem as additional air pressure is added to the tire.
FIG. 6B is a detail view of the portion of the tire valve cap enclosed in the detail circle A of FIG. 6A.
FIG. 6C is a detail perspective view of the bottom plate of the inner colored sleeve.

Another advantage of the tire valve cap 10 of the present invention is that it is preferably configured so that high pressure air may be introduced into the tires through an entry port 70 in the top of the tire valve cap 10. Thus, if a status indicator of low pressure is observed, the user may refill the pressure in the tire without removing the cap gauge 10. FIG. 6A illustrates a cap gauge 10 during such a refilling operation.

The entry port 70 is formed in the main housing 14, and is bounded at its upper edge by the main housing lip 60, which surrounds a smaller diameter aperture 72 for the upper portion of the entry port 70. This aperture 72 is generally sealed against dirt and water intrusion by engagement of the flanged portion 58 of the inner colored sleeve 20 with the lip 60, as will be discussed below.

Referring also to FIGS. 4 and 5A, when more pressure is not being added to the tire, the inner colored sleeve 20 is urged upward by the biasing spring 22, until the flange 58 contacts the lip 60 of the main housing 14. During operation with sufficient pressure included, as shown in FIG. 5A, the outer colored sleeve 24 is forced upward by air pressure, so the biasing spring 22 is compressed, and the inner colored sleeve 20 is seated with the flange 58 engaged with the lip 60.

Returning to FIG. 6A, when high pressure air is to be added to a tire through the tire valve cap 10, an air hose or other high pressure air source (not shown) having an air chuck pin 76 is pressed onto the cap tire valve cap 10. The air chuck pin 76 presses on the top of the inner colored sleeve 20 containing the calibration screw 28. The inner colored sleeve 20 is forced down against the biasing spring 22, which moves the flange 58 of the inner sleeve 20 out of its seat against the lip 60 of the main housing 14, thus opening the entry port 70 to air flow from the air hose. It can be seen that the air chuck pin 76 has forced the outer colored sleeve 24 down until the bottom plate 46 meets the floor 78 of the internal housing 32.

FIG. 6C is an isometric view of the bottom plate 46 of the outer colored sleeve 24. From this perspective, it can be seen that the bottom plate 46 includes a slot which creates a horizontal passage 86, much in the same way as a similar slot creates a horizontal passage 84 in the contact plate 40 of the air nozzle 36, as referred to above. The horizontal passage 86 in the bottom plate 46 allows air to pass to or from the upper end of the air passage 38 which has been configured in the air nozzle 36.

FIG. 6B shows an enlarged detail view of circle A of FIG. 6A. In this detail view, it can be seen that the inner bore 44 of the internal housing 32 has an enlarged diameter portion 80. The tip of the lipped O-ring 30 is formed with a diameter such that it contacts the internal housing inner bore 44 when the outer colored sleeve 24 is pressed upward by tire air pressure, as in FIG. 5A. This makes an air-tight seal between the outer colored sleeve 24 and inner bore 44 of the internal housing 32. However, when the outer colored sleeve 24 has been forced downward by an air chuck pin 76, as in FIG. 6A, or when the tire pressure is low, or if the tire valve cap 10 is disengaged, as in FIG. 4, the lipped O-ring 30 resides in the enlarged diameter portion 80 of the internal housing inner bore 44. In this position, the lipped O-ring 30 does not contact the walls of the internal housing 32, and no air-seal is formed. High pressure air from an air hose is thus able to freely flow through the upper air passages 82, into horizontal passage 86 of the bottom plate 46, through air passage 38 of air nozzle 36, through the horizontal passage 84 of contact plate 40, around valve core pin 66 finally into the valve stem 2, and thus into the tire (not shown).

Thus, re-pressurizing of the tire can be accomplished without removing the tire valve cap 10, which is a great convenience. The user can introduce a bit of air pressure, remove the air hose, and see if the pressure is sufficient to allow the green outer colored sleeve 24 safety indicator to be displayed. If not, more is added until a safe level of pressure has been achieved and the green safety indicator is in view.

As mentioned above, the tire valve cap 10 can be calibrated to allow for the varying pressure in many types and styles of tires. This is accomplished by adjusting the calibration screw 28 using screw slot 29. The compression of the biasing spring 22 is adjustable by advancing the calibration screw 28 in the threads 56 of the inner colored sleeve 20. As the calibration screw 28 is advanced in the screw threads 56, the spring is compressed more, and thus more force from air pressure is required to push the outer colored sleeve 24 safety indicator upward into view. Alternately, as the calibration screw 28 is backed out of the threads 56, the spring tension is released, and less air pressure is required to display the outer colored sleeve 24. By this mechanism, the air pressure in the tire to be used can be adjusted for, so that the green safety indicator is displayed at the appropriately calibrated tire pressure.

Referring now to all the figures generally, the invention can be described in alternate terms, namely the pressure indicator assembly 18 can be described as including a piston 88, which has a safe pressure indication 90, being the green outer colored sleeve 24, an internal bore 92 and a bottom plate 46. The pressure indicator assembly 18 also includes a warning indicator 94, which is the red inner colored sleeve 20, that is seated within the internal bore 92 of the piston 88. Biasing spring 22 is fitted between the warning indicator 94 and the safe pressure indicator 90, and acts to urge them apart. The warning indicator 94 is visible through the transparent portion 16 of the main housing 14, when low tire air pressure is applied to the piston 88. When a safe level of air pressure is applied to the bottom plate 46 of the piston 88, the piston 88 is moved upward against the force of the biasing spring 22, so that the red warning indicator 94 is surrounded within the internal bore 92 of the green safe pressure indicator 90, and the green safe pressure indicator 90 is displayed in the transparent portion 16.

When high pressure air is to be delivered to the tire 1, the air chuck 76 forces the pressure indicator assembly 18 to compress against the biasing spring 22 and opens entry port 70 so that air can travel around the piston 88 and through the air passage 38 to the tire 1.

While the invention has been disclosed and described with regard to specific preferred embodiments, it is intended by the inventor that the following claims cover not only the specific embodiments described herein but other and further altered devices that would occur to those skilled in the art upon reviewing the specification and drawings provided herein. It is therefore intended that the following claims cover all such alterations and modifications which nevertheless include the true spirit and scope of the invention.

What is claimed is:

1. A tire valve cap for mounting on a valve stem of a tire for indicating a safe pressure condition or a low pressure warning, comprising:

a pressure indicator assembly including:

a piston having a safe pressure indicator, and an internal bore;

a warning indicator which is seated within said internal bore of said piston; and a biasing spring which is fitted between said warning indicator and said safe pressure indicator, and acts to urge them apart, such that said warning indicator is displayed when low pressure is applied to said piston, and when a safe level of air pressure is applied to said piston, said piston is moved against the force of said biasing spring to surround said warning indicator, and said safe pressure indicator is displayed:

a main housing, having a transparent portion through which said warning indicator and said safe pressure indicator are displayed, wherein pressure to be monitored is applied to a bottom plate of said piston, and a safe level of air pressure will move said piston upward into said transparent portion of said main housing against the urging of said biasing spring; and an internal housing having an inner bore into which said piston is seated;

wherein said internal housing includes an air nozzle having a contact plate which engages a valve core pin of a tire valve stem to allow flow of pressurized air into and out of the tire and said air nozzle includes an air passage which conveys pressurized air to contact a bottom plate of said piston which is seated in said inner bore of said internal housing, wherein said contact plate includes a slot which forms a horizontal air passage for air to flow between said tire valve stem and said air passage of said air nozzle and wherein said inner bore of said internal housing includes an enlarged diameter inner bore portion wherein said piston fits within said internal housing inner bore, and includes a lipped O-ring which forms an air tight seal with said internal housing inner bore when sufficient pressure has displaced said piston upwards a sufficient amount, but which does not contact said inner bore of said internal housing when insufficient pressure exists to displace said piston upwards, and thus passage of air is allowed.

2. The tire valve cap of claim 1, wherein:
said main housing includes an air entry port through which air from an air source may be pumped to enter said tire without removal of said cap gauge from said valve stem.

3. The tire valve cap of claim 2, wherein:
said warning indicator includes a flange which is urged by said biasing spring to close said entry port when air from an air hose is not being pumped into said tire.

4. The tire valve cap of claim 3, wherein:
said bottom plate of said piston includes a slot which forms a horizontal air passage for air to flow between said air entry port and said air passage of said air nozzle of said internal housing.

5. The tire valve cap of claim 4, wherein:
said pressure indicator assembly is compressible against said biasing spring when high pressure air is to be delivered to said tire.

6. The tire valve cap of claim 1, wherein:
said safe pressure indicator is a green colored sleeve which is a portion of said piston.

7. The tire valve cap of claim 1, wherein:
said warning indicator is a red colored sleeve.

8. The tire valve cap of claim 1, wherein said main housing further comprises:
a locking nut having interior screw threads to engage external threads of a tire valve stem.

9. The tire valve cap of claim 1, further comprising:
a calibration screw, which can be adjusted to calibrate the cap gauge to the appropriate air pressure in a tire.

10. The tire valve cap of claim 9, wherein:
said calibration screw is threadably engaged in said warning indicator, and acts to compress said biasing spring when rotated.

11. A tire valve cap for mounting on a valve stem of a tire while in continued use on a vehicle for indicating when the tire pressure of a vehicle tire is either low or sufficient, comprising:

a housing having an engagement means for the operative engagement of said tire valve cap with said valve stem of said tire;

a pressure indicator assembly within said housing, said pressure indicator assembly comprising;

a low pressure warning indicator which indicates a low pressure condition;

a safe pressure indicator which indicates a sufficient pressure condition;

a biasing spring which forces said safe pressure indicator out of view unless sufficient pressure is applied on said bottom plate of said safe pressure indicator to force it into view in place of said warning indicator, wherein said warning indicator includes an inner colored sleeve, and said safe pressure indicator includes an outer colored sleeve, which is movable against the urging of said biasing spring to surround said inner colored sleeve, wherein said outer colored sleeve is colored green and said inner colored sleeve is colored red, wherein said housing includes a locking nut portion having internal threads which are configured to mate with external threads of said valve stem, said housing includes an air entry port through which air from an outside source may be pumped to enter said tire without removal of said cap gauge from said valve stem, said inner colored sleeve includes a flange which is urged by said biasing spring to close said entry port when air is not being pumped into said tire, and said housing includes a transparent portion through which said warning indicator and said safe pressure indicator may be viewed during the corresponding pressure conditions; and an internal housing having an inner bore, an enlarged diameter inner bore portion, an air nozzle and a contact plate, wherein said outer colored sleeve fits within said internal housing inner bore, and includes a lipped O-ring which forms an air tight seal with said internal housing inner bore when sufficient pressure has displaced said inner colored sleeve upwards a sufficient amount, but which does not contact said inner bore of said internal housing when insufficient pressure exists to displace said inner colored sleeve upwards.

12. The tire valve cap of claim 11, further comprising:
a secondary spring positioned between said internal housing and said outer colored sleeve.

13. The tire valve cap of claim 11, wherein:
said calibration screw is included in said warning indicator, and acts to compress said biasing spring when rotated.

* * * * *